(12) United States Patent
Xuan (10) Patent No.: US 10,171,604 B2
(45) Date of Patent: Jan. 1, 2019

(54) SYSTEM AND METHOD FOR PUSHING NETWORK INFORMATION

(71) Applicant: TENCENT TECHNOLOGY (SHENZHEN) COMPANY LIMITED, Shenzhen, Guangdong (CN)

(72) Inventor: Liyong Xuan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 279 days.

(21) Appl. No.: 14/565,883

(22) Filed: Dec. 10, 2014

(65) Prior Publication Data
US 2015/0095412 A1 Apr. 2, 2015

Related U.S. Application Data

(63) Continuation-in-part of application No. PCT/CN2013/079431, filed on Jul. 16, 2013.

(30) Foreign Application Priority Data

Jul. 16, 2012 (CN) .......................... 2012 1 0245750

(51) Int. Cl.
*G06F 15/16* (2006.01)
*H04L 29/08* (2006.01)
(Continued)

(52) U.S. Cl.
CPC ......... *H04L 67/26* (2013.01); *G06Q 30/0242* (2013.01); *H04L 67/306* (2013.01); *H04L 67/42* (2013.01)

(58) Field of Classification Search
CPC ....... H04L 67/26; H04L 67/306; H04L 67/42; G06Q 30/0242
See application file for complete search history.

(56) References Cited

U.S. PATENT DOCUMENTS 7,493,372 B2 * 2/2009 Crabtree ........... G06F 17/30867
379/201.02
7,729,709 B1 * 6/2010 Loeb .................... H04L 67/306
455/2.01
(Continued)

FOREIGN PATENT DOCUMENTS

CN 1988576 A 6/2007
CN 101034997 A 9/2007
(Continued)

OTHER PUBLICATIONS

Extended European Search Report dated Dec. 7, 2015 in related European Application No. 13820068.8.
(Continued)

*Primary Examiner* — Michael Won
(74) *Attorney, Agent, or Firm* — Morgan, Lewis & Bockius LLP (57) ABSTRACT

The present disclosure generally provides a system for pushing network information. The system includes a pushing server and a processing server. The pushing server is used for pushing predefined network information contents and corresponding interaction information to a first client, and for obtaining feedback information from the first client in response to the interaction information, and submitting the feedback information to a processing server, the feedback information includes a first user ID. The processing server is used for processing the feedback information, and generating an attention index corresponding to the first user ID. The system may accurately acquire the attention index of the users toward the network information. A method for pushing network information is provided as well.

17 Claims, 4 Drawing Sheets

(51) Int. Cl.
*H04L 29/06* (2006.01)
*G06Q 30/02* (2012.01)

(56) References Cited

U.S. PATENT DOCUMENTS

| | | | |
|---|---|---|---|
| 2002/0023230 A1* | 2/2002 | Bolnick | G06Q 30/02 |
| | | | 726/28 |
| 2004/0208496 A1* | 10/2004 | Pilu | H04N 5/232 |
| | | | 396/263 |
| 2006/0068818 A1* | 3/2006 | Leitersdorf | H04H 20/18 |
| | | | 455/466 |
| 2007/0156838 A1 | 7/2007 | Kocho et al. | |
| 2009/0198542 A1 | 8/2009 | D'Amore et al. | |
| 2010/0223094 A1 | 9/2010 | Cumming et al. | |
| 2011/0231226 A1* | 9/2011 | Golden | G06Q 30/02 |
| | | | 705/7.32 |
| 2014/0282153 A1* | 9/2014 | Christiansen | G06Q 30/0201 |
| | | | 715/765 |
| 2015/0120718 A1* | 4/2015 | Luo | G06F 17/30699 |
| | | | 707/728 |
| 2016/0253710 A1* | 9/2016 | Publicover | G06Q 30/02 |

FOREIGN PATENT DOCUMENTS

| | | |
|---|---|---|
| CN | 101335636 A | 12/2008 |
| CN | 102075543 A | 5/2011 |
| CN | 102118714 A | 7/2011 |
| CN | 102387207 A | 3/2012 |
| CN | 102546972 A | 7/2012 |

OTHER PUBLICATIONS

International Search Report dated Oct. 24, 2013, in corresponding International Patent Application No. PCT/CN2013/079431.
Chinese Office Action dated May 9, 2017, in corresponding Chinese Patent Application No. 201210245750.6.
Tencent Technology, Written Opinion, PCT/CN2013/079431, dated Oct. 24, 2013, 8 pgs.
Tencent Technology, IPRP, PCT/CN2013/079431, Jan. 20, 2015, 9 pgs.

* cited by examiner

SYSTEM AND METHOD FOR PUSHING NETWORK INFORMATION

CROSS-REFERENCE TO RELATED APPLICATIONS

The present application is a continuation-in-part (CIP) of International Application PCT/CN2013/079431, filed Jul. 16, 2013, and claims foreign priority to Chinese Application 201210245750.6 filed Jul. 16, 2012, which are incorporated herein by reference in their entireties.

FIELD OF THE INVENTION

The present disclosure relates generally to the field of internet technology, and particularly, to a system and method for pushing network information.

BACKGROUND OF THE INVENTION

Typical systems push network information through a server for pushing predefined network information to mass clients in the network. The pushed network information could thereby be displayed in the clients, without regard to whether the corresponding network information is clicked by the user. By default, some system might simply consider all pushed network information to have been visited (e.g. through click or copy) by a user. Users are getting increasingly inattentive on pushed network information along with the explosion of such information. Moreover, such typical systems for pushing network information are unable to accurately determine the degree of attention of the pushed information by the users because it is impossible for the systems to be aware of whether the pushed information is paid attention by the user through either a click or a copy operation. As a result, the systems can lose priority in the promotion of particular network applications and in providing more oriented network service for users.

SUMMARY OF THE INVENTION

Accordingly, it is necessary to provide a system for pushing network information, which can acquire the attention index of the users towards the network information through feedback.

A system for pushing network information includes:

a pushing server, configured to push predefined network information contents and corresponding interaction information to the first client, and to obtain feedback information from the first client in response to the interaction, and to submit the feedback information to a processing server, the feedback information comprising a first user ID;

a processing server, configured to process the feedback information, and to generate an attention index corresponding to the first user ID.

Besides, it is necessary to provide a method for pushing network information, which is enables accurate collection of the users' attention on the network information.

A method for pushing network information includes:

pushing, through a pushing server, predefined network information content and corresponding interaction information to a first client, and obtaining feedback information uploaded from the first client; submitting the feedback information to a processing server, wherein the feedback information comprises a first user ID;

processing, through a processing server, the feedback information, and generating an attention index corresponding to the first user ID.

The provided system and method for pushing network information pushes interaction information corresponding to the network information contents together with pushing the network information contents through the pushing server, and processes the feedback information from the first client through the processing server, thereby generates the attention index corresponding to the first user ID. The system and method obtains the feedback information through the feedback channel, which could improve the accuracy of the users' attention index on the network information, and may enable to provide much more oriented network service to the users.

DESCRIPTION OF THE PREFERRED EMBODIMENTS

In order to make the purpose, technical scheme and advantage of embodiments of the present invention more clear, further details with the following combinations of figures and embodiments are discussed herein. It should be understood that specific embodiments described here are only used to explain the present invention, not to limit it.

Figure 1:
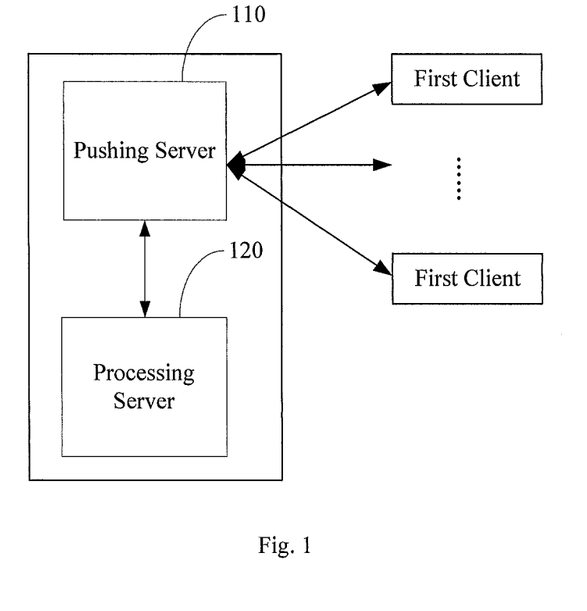
FIG. 1 is a block diagram of a system for pushing network information according to an exemplary embodiment.

FIG. 1 shows one exemplary embodiment, in which a system for pushing network information includes a pushing server 110 and a processing server 120.

The pushing server 110 is configured to push predefined network information contents and corresponding interaction information to a first client, and obtain feedback information by the first client in response to the interaction information. The pushing server 110 submits the feedback information to the processing server 120, wherein the feedback information contains a first user ID.

The network information contents may, for example, correspond to physical products or network applications. The pushing server 110 has the network information content stored therein. It shall be appreciated that the network information content may be contents that are used for network information. Further, the pushing server 110 can have multiple network information contents stored therein, while the stored network information contents are aligned in the pushing server through predetermined alignment. The pushing server 110 pushes the network information contents to the first client through the predetermined alignment.

The pushing server 110 may also have interaction information corresponding to the network information contents stored therein. To be more specific, the interaction information may, for example, be predefined interaction questions corresponding to the network information contents, e.g. "What is the name of the product mentioned in the network information?", "What is the product mentioned in the network information mainly used for?" According to the present embodiment, the feedback information submitted/uploaded by the first client corresponding to the interaction information is the response to the interaction questions.

Besides, the interaction information may be installation information for particular network applications, the feedback information from the first client thereby may be installation operation instruction for the network application accordingly.

It shall be appreciated that the first client can be any type of client that can interchange data with the pushing server 110, for example a browser or other clients for applications. Accordingly, the first user ID is the ID that is used for uniquely identifying particular network user.

In accordance with another embodiment, the pushing server 110 may further be configured to randomly select interaction information corresponding to the network information content, and configured to push the selected interaction information to the first client.

Said random selection of the interaction information to be pushed to the first client enables different interaction information to be pushed to the first clients even if corresponding network information contents are the same. System robustness may be enhanced through requiring users to submit the correct feedback information by actually paying attention to the network information contents. Moreover, the validity of the received feedback information in the pushing server can be ensured.

The processing server 120 is configured to process the feedback information, and to generate an attention index corresponding to the first user ID.

More specifically, the processing server 120 may have stored model information respectively in relation to the interaction information. For instance, if the interaction information is the interaction questions, the model information can be the correct answers to the interaction questions; or if the interaction information is the installation information for particular network application, the model information may be the success installation information for the network application.

Moreover, the processing server 120 is configured to compare the feedback information with the model information to determine if there exists mutual consistency. The processing server 120 determines the user corresponding to the first user ID to have followed the network information content if it is consistent; or determines the user corresponding to the first user ID have not followed the network information content.

More specifically, the processing server 120 may accordingly generate an attention index corresponding to the first user ID based on the determination. For instance, if it is determined that the user has followed the network information content, the processing server 120 would generate the attention index to be "a"; or otherwise generate the attention index to be "0"; wherein "a" can be a constant.

In still another embodiment, the pushing server 110 is further configured to generate a promotion link that includes a first user ID corresponding to the network information content, and to push the promotion link to the first client.

In detail, the pushing server 110 may obtain the first user ID before pushing the network information content and corresponding interaction information to the first client, and generate the promotion link that includes the first user ID accordingly. The pushing server 110 further pushes the promotion link to the first client together with the network information content and corresponding interaction information.

In accordance with another embodiment of the present disclosure, the pushing server 110 is further configured to obtaining a request for link from the first client. The request for link contains the first user ID. The pushing server 110 generates the promotion link according to the request for link. In such embodiment, the first client displays the network information content and corresponding interaction information pushed from the pushing server 110, and generates the request for link according to the user operation thereafter, while the request for link is sent to the pushing server 110.

Further, the promotion link can be communicated among different clients through instant messaging tools, microblogs, message boards, or emails.

Figure 2:
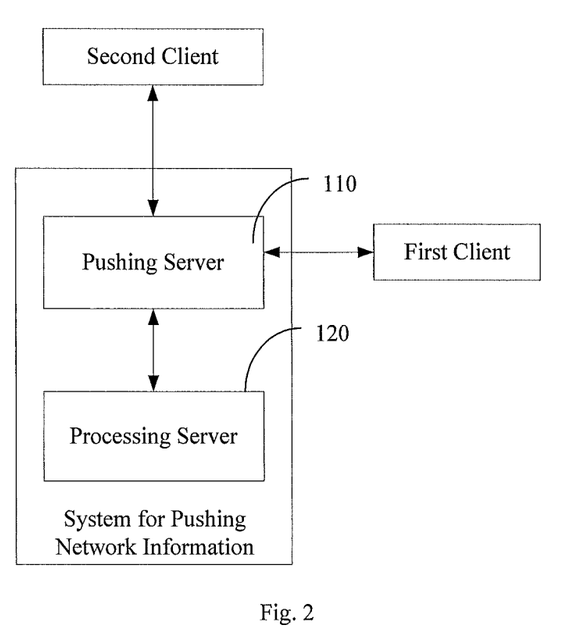
FIG. 2 is a block diagram showing an application of the system for pushing network information according to another exemplary embodiment.

FIG. 2 shows another embodiment, wherein the pushing server 110 is configured to obtain an access request from a second client concerning the promotion link, and configured to push the predefined network information contents and corresponding interaction information to the second client according to the access request.

More specifically, the access request may be generated through clicking the promotion link on the second client. The access request may contain a second user ID. In the present embodiment, after the pushing server 110 obtains the access request from the second client, the predefined network information contents and corresponding interaction information may be pushed to the second client, which facilitates the network information contents to be distributed among multiple different clients and benefits the promotion of the network service.

It shall be appreciated that the mentioned first client and the mentioned second client are relatively referred and could be exchanged in desired applications under which the first client can be the second while the second client can be the first. The naming of the first client and the second client is only used for distinguishing different clients rather than any other special reference. The mentioned first and second user IDs are of the same reference for distinguishing the different users.

It shall also be appreciated that FIG. 2 illustrates the simplest application scenario of the system for pushing network information. After the second client receives the promotion link, the second client may further distributing the promotion link to other clients, wherein the other clients visits the promotion link and obtains the predefined network information contents and corresponding interaction information.

In accordance with one of the exemplary embodiment, the access request contains the first user ID and the second user ID. The pushing server 110 is further configured to submit the first user ID and the second user ID to the processing server 120. The processing server 120 is further configured to set up a mapping relationship between the first user ID and the second user ID, and set the corresponding level of the first user ID and the second user ID on the mapping relationship.

In detail, the processing server 120 is configured to set the level of the second user ID to be one level lower than its corresponding first user ID, after the mapping relation is set. For instance, the processing server 120 sets the level of the first user ID with the highest level to be level 1, and the second user ID corresponding to this highest level first user ID to be level 2, and so on.

Further, the access request that is obtained by the pushing server 110 may be multiple that are sent from multiple second clients. In this case, the processing server may set up the mapping relationship among the first user ID and the second user IDs to be one-to-many. The processing server 120 can be configured to set multiple second user IDs that are corresponding to the first user ID to be of the same level.

According to one embodiment, the processing server 120 is further configured to generate an attention index corresponding to the second user ID according to the levels of the first user ID and the second user ID, and the feedback information corresponding to the second user ID sent by the second client.

In detail, the pushing server 110 is configured to collect the feedback information corresponding to the second user ID that is uploaded through the second client, and configured to submit the feedback information corresponding to the second user ID to the processing server 120. The processing server 120 is configured to determine whether the level of the second user ID is the lowest. If the level of the second user ID is the lowest, the processing server 120 directly generates the attention index corresponding to the second user ID according to the feedback information; or otherwise, the processing server 120 obtains attention indexes that are corresponding to those user IDs with lower levels than the second user ID, before generating the attention index corresponding to the second user ID according to the attention indexes corresponding to the lower leveled user IDs and the feedback information corresponding to the second user IDs.

According to one embodiment, the processing server 120 is further configured to read an attention index corresponding to the second user ID, and configured to adjust the attention index corresponding to the first user ID according to levels of the first user ID and the second user ID, together with the attention index corresponding to the second user ID.

To be more specific, the processing server 120 finds out the lower level second user IDs of the first user ID according to the mapping relationship, and obtains the attention index corresponding to each of the second user ID.

Furthermore, according to one of the embodiments, the processing server 120 may be configured to adjust the attention index corresponding to the first user ID in the below way:

Adjusted attention index corresponding to the first user ID=Attention index corresponding to the first user ID+Attention index corresponding to the second user ID$*y*10^{j-k}$, wherein j is the level of the first user ID, k is the level of the second user ID, y is a constant less than 0.1.

In the current embodiment, communication may be conducted among different clients through promotion links, thereby further adjusting the attention index corresponding to the first user ID, further improving the accuracy of the obtained attention index.

In accordance with a further embodiment, the processing server 120 may be configured to obtain user profile settings corresponding to the attention index according to the mapping relationship between the attention index and the user profile settings, and configured to set the user profile of the corresponding user IDs according to the obtained user profile settings.

Further, the user profile may include at least one of user level, user credit, etc. The user ID may include either the first user ID or the second user ID, and may be generally referenced as the user IDs for all related network users. The processing server 120 may have stored the mapping relationship between the attention index corresponding to the first user ID and the user profile settings of multiple users, i.e. the attention index mapping with the user credit profile settings. The processing server 120 may be further configured to obtain the user profile settings mapped with the obtained attention index corresponding to the first user ID, and configured to set the user profiles corresponding to the first user IDs according to the obtained user profile settings.

To be specific, an example of user credit is explained herein. The processing server 120 looks up, in the mapping relationship between the attention index corresponding to the first user ID and the user credit settings, for the mapped record that is corresponded to the attention index of the first user ID, according to the attention index obtained above. The processing server 120 obtains the user credit settings according to the mapped record, and modifies the user credit according to the user credit settings.

It shall be appreciated that, although the system as described in the above includes the pushing server 110 and the processing server 120, the system provided herein shall, according to other available embodiments, includes a server that implements as both the pushing server 110 and the processing server 120. In those embodiments, the server may be configured to push predefined network information contents and corresponding interaction information to a first client, and obtain feedback information by the first client in response to the interaction information; to process the feedback information, and to generate an attention index corresponding to the first user ID; to randomly select interaction information corresponding to the network information content, and configured to push the selected interaction information to the first client.

It shall also be appreciated that the pushing server 110 and the processing server 120 may respectively include corresponding modules for the implementation of the embodiments as described above. To be exemplary but not limited, the pushing server 110 may include a pushing module for pushing predefined network information contents and corresponding interaction information to a first client; and obtaining feedback information by the first client in response to the interaction information. The processing server 120 may similarly include a processing module for processing the feedback information; and generating an attention index corresponding to the first user ID, etc.

Accordingly, the system according to the present disclosure may comprises a server that includes the modules of the pushing server 110 and the modules of the processing server 120 as described above. Respectively, the modules may interact as a system for pushing network information as described above.

Figure 3:
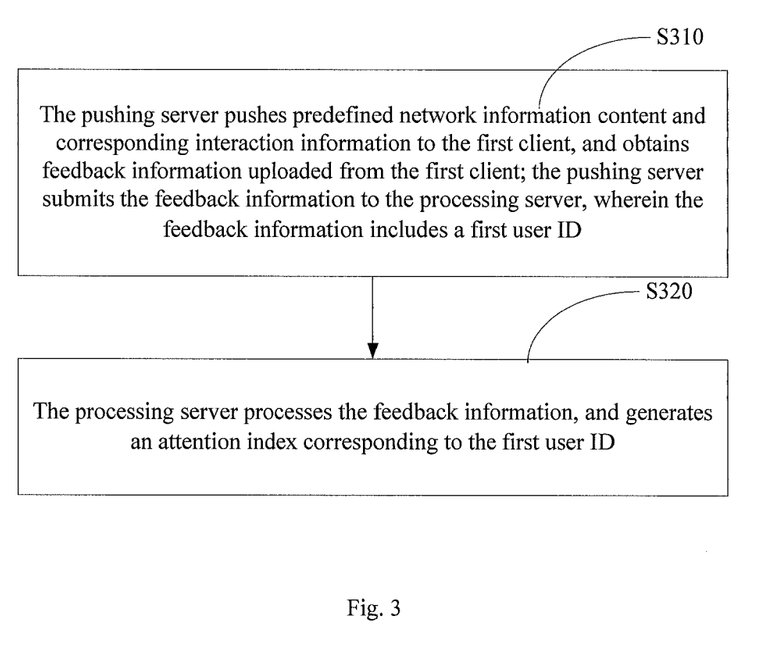
FIG. 3 is a flow diagram of a method for pushing network information according to an exemplary embodiment.

Referring now to FIG. 3, a method for pushing network information in accordance with an embodiment includes:

Step S310, the pushing server pushes predefined network information content and corresponding interaction information to the first client, and obtains feedback information uploaded from the first client; the pushing server submits the feedback information to the processing server, wherein the feedback information includes a first user ID.

The network information contents may be corresponded to the physical products or network applications. The pushing server has the network information content stored therein. It shall be appreciated that the network information content may be contents that are used for network information. Further, the pushing server can have multiple network information contents stored therein, while the stored network information contents are aligned in the pushing server through predetermined alignment. The pushing server pushes the network information contents to the first client through the predetermined alignment.

The pushing server may also have interaction information corresponding to the network information contents stored therein. To be more specific, the interaction information may be predefined interaction questions corresponding to the network information contents, e.g. "What is the name of the product mentioned in the network information?", "What is the product mentioned in the network information mainly used for?" According to the present embodiment, the feedback information submitted/uploaded by the first client corresponding to the interaction information is the response to the interaction questions.

Besides, the interaction information may be installation information for particular network applications, the feedback information from the first client thereby may be installation operation instruction for the network application accordingly.

It shall be appreciated that the first client can be any type of client that can interchange data with the pushing server, for example a browser or other clients for applications. Accordingly, the first user ID is the ID that is used for uniquely identifying particular network user.

In accordance with another embodiment, in step S310, when the pushing server pushes the network information content and the corresponding interaction information to the first client, the pushing server may randomly select the interaction information corresponding to the network information content.

Said random selection of the interaction information to be pushed to the first client enables different interaction information to be pushed to the first clients even if corresponding network information contents are the same. System robustness may be enhanced through preventing users to submit the correct feedback information without actually paying attention to the network information contents, the validity of the received feedback information in the pushing server can be ensured accordingly.

Step S320, the processing server processes the feedback information, and generates an attention index corresponding to the first user ID.

More specifically, the processing server may have stored model information respectively in relation to the interaction information. For instance, if the interaction information is the interaction questions, the model information can be the correct answers to the interaction questions; or if the interaction information is the installation information for particular network application, the model information may be the success installation information for the network application.

Moreover, in step S320, the processing server may compare the feedback information with the model information to determine if there exists mutual consistency. It is determined that the user corresponding to the first user ID has followed the network information content if it is consistent; or it is determined that the user corresponding to the first user ID have not followed the network information content.

More specifically, the processing server may accordingly generate an attention index corresponding to the first user ID based on the determination. For instance, if it is determined that the user has followed the network information content, the processing server 120 would generate the attention index to be "a"; or otherwise generate the attention index to be "0"; wherein "a" can be a constant. In still another embodiment, the method for pushing network information further includes: the pushing server generates a promotion link that includes a first user ID corresponding to the network information content, and pushing the promotion link to the first client.

In detail, the pushing server may obtain the first user ID before pushing the network information content and corresponding interaction information to the first client, and generating the promotion link that includes the first user ID accordingly. The pushing server 110 further pushes the promotion link to the first client together with the network information content and corresponding interaction information.

In accordance with another embodiment of the present disclosure, the pushing server is further configured to obtaining a request for link from the first client. The request for link contains the first user ID. The pushing server generates the promotion link according to the request for link. In such embodiment, the first client displays the network information content and corresponding interaction information pushed from the pushing server, and generates the request for link according to the user operation thereafter, while the request for link is sent to the pushing server.

Further, the promotion link can be communicated among different clients through instant messaging tools, microblogs, message boards, or emails.

According to one of the embodiment, the pushing server obtains an access request from a second client concerning the promotion link, and pushes the predefined network information contents and corresponding interaction information to the second client according to the access request.

More specifically, the access request may be generated through clicking the promotion link on the second client. The access request may contain a second user ID. In the present embodiment, after the pushing server obtains the access request from the second client, the predefined network information contents and corresponding interaction information may be pushed to the second client, which facilitates the network information contents to be distributed among multiple different clients and benefits the promotion of the network service.

In accordance with one of the exemplary embodiment, the access request contains the first user ID and the second user ID. After the step that the pushing server obtains the access request for the promotion link from the second client, the method further includes: the pushing server submits the first user ID and the second user ID to the processing server. The processing server sets up a mapping relationship between the first user ID and the second user ID, and sets the corresponding level of the first user ID and the second user ID on the mapping relationship.

In detail, the processing server sets the level of the second user ID to be one level lower than its corresponding first user ID, after the mapping relation is set. For instance, the processing server sets the level of the first user ID with the highest level to be level 1, and the second user ID corresponding to this highest level first user ID to be level 2, and so on.

Further, the access request that is obtained by the pushing server may be multiple that are sent from multiple second clients. In this case, the processing server may set up the mapping relationship among the first user ID and the second user IDs to be one-to-many. The processing server may set multiple second user IDs that are corresponding to the first user ID to be of the same level.

According to one embodiment, the method for pushing network information further includes: the processing server generates an attention index corresponding to the second user ID, according to the levels of the first user ID and the second user ID, and the feedback information corresponding to the second user ID sent by the second client.

In detail, the pushing server collects the feedback information corresponding to the second user ID that is uploaded through the second client, and submits the feedback information corresponding to the second user ID to the processing server. The processing server determines whether the level of the second user ID is the lowest. If the level of the second user ID is the lowest, the processing server directly generates the attention index corresponding to the second user ID according to the feedback information; or otherwise, the processing server obtains attention indexes that are corresponding to those user IDs with lower levels than the second user ID, before generating the attention index corresponding to the second user ID according to the attention indexes corresponding to the lower leveled user IDs and the feedback information corresponding to the second user IDs.

According to one embodiment, after the processing server generates the attention index corresponding to the second user ID, the method further includes: the processing server 120 reads an attention index corresponding to the second user ID, and adjust the attention index corresponding to the first user ID according to levels of the first user ID and the second user ID, together with the attention index corresponding to the second user ID.

To be more specific, the processing server finds out the lower level second user IDs of the first user ID according to the mapping relationship, and obtains the attention index corresponding to each of the second user ID.

Furthermore, according to one of the embodiments, the processing server may adjust the attention index corresponding to the first user ID in the below way:

Adjusted attention index corresponding to the first user ID=Attention index corresponding to the first user ID+Attention index corresponding to the second user ID$*y*10^{j-k}$, wherein j is the level of the first user ID, k is the level of the second user ID, y is a constant less than 0.1.

In the current embodiment, communication may be conducted among different clients through promotion links, thereby further adjusting the attention index corresponding to the first user ID, further improving the accuracy of the obtained attention index.

In accordance with a further embodiment, the method for pushing network information further includes: the processing server obtains user profile settings corresponding to the attention index according to the mapping relationship between the attention index and the user profile settings, and sets the user profile of the corresponding user IDs according to the obtained user profile settings.

Further, the user profile may include at least one of user level, user credit, etc. The user ID may include either the first user ID or the second user ID, and may be generally referenced as the user IDs for all related network users. The processing server may have stored the mapping relationship between the attention index corresponding to the first user ID and the user profile settings of multiple users, i.e. the attention index mapping with the user credit profile settings. The processing server may obtain the user profile settings mapped with the obtained attention index corresponding to the first user ID, and set the user profiles corresponding to the first user IDs according to the obtained user profile settings.

To be specific, an example of user credit is explained herein. The processing server looks up, in the mapping relationship between the attention index corresponding to the first user ID and the user credit settings, for the mapped record that is corresponded to the attention index of the first user ID, according to the attention index obtained above. The processing server obtains the user credit settings according to the mapped record, and modifies the user credit according to the user credit settings.

The system and method for pushing network information make use of the way that pushes interaction information corresponding to the network information contents together with pushing the network information contents through the pushing server, and processes the feedback information from the first client through the processing server. The processing server would obtain the attention index only if the first client participates in the interaction and feedback with the feedback information. The users that have not followed the network information would not be mistakenly considered as have followed through the present system and method, and accuracy for obtaining the attention index can be reached.

To be illustrative but not limited, other embodiments of the system and method for pushing network information according to the present disclosure may include a pushing module and a processing module respectively implementing as the pushing server 110 and the processing server 120 as in the above described embodiments. The pushing module and the processing module are respectively configured as the pushing server 110 and the processing server 120 either in a combination to be included in a computing machine, e.g. a computer, a server, etc, or separately in different computing machines, which then jointly functions as the system for pushing network information of the present disclosure.

Figure 4:
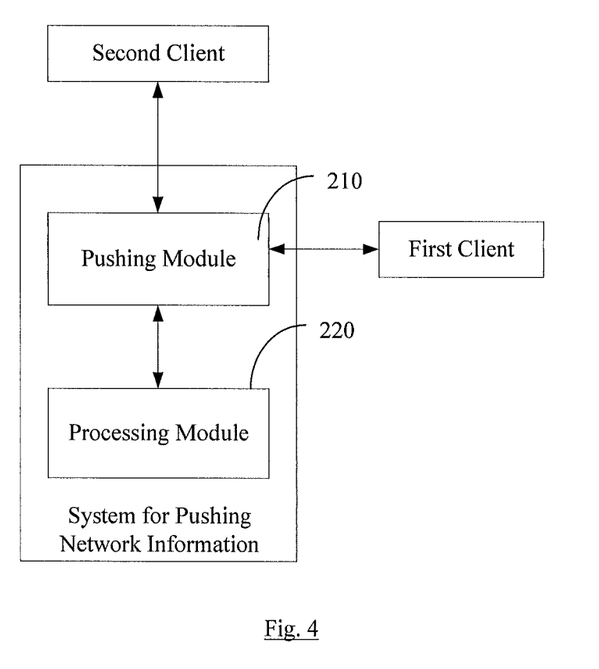
FIG. 4 is a block diagram showing a system for pushing network information according to another embodiment.

FIG. 4 shows in this case a system for pushing network information which includes a pushing module 210 and a processing module 220. The pushing module 210 is configured to push predefined network information contents and corresponding interaction information to a first client, and obtain feedback information by the first client in response to the interaction information. The pushing module 210 submits the feedback information to the processing module 220, wherein the feedback information contains a first user ID.

The network information contents may be corresponded to the physical products or network applications. The pushing module 210 has the network information content stored therein. It shall be appreciated that the network information content may be contents that are used for network information. Further, the pushing module 210 can have multiple network information contents stored therein, while the stored network information contents are aligned in the pushing server through predetermined alignment. The pushing module 210 pushes the network information contents to the first client through the predetermined alignment.

The pushing module 210 may also have interaction information corresponding to the network information contents stored therein. To be more specific, the interaction information may be predefined interaction questions corresponding to the network information contents, e.g. "What is the name of the product mentioned in the network information?", "What is the product mentioned in the network information mainly used for?" According to the present embodiment, the feedback information submitted/uploaded by the first client corresponding to the interaction information is the response to the interaction questions.

Besides, the interaction information may be installation information for particular network applications, the feedback information from the first client thereby may be installation operation instruction for the network application accordingly.

It shall be appreciated that the first client can be any type of client that can interchange data with the pushing module 210, for example a browser or other clients for applications. Accordingly, the first user ID is the ID that is used for uniquely identifying particular network user.

In accordance with another embodiment, the pushing module 210 may further be configured to randomly select interaction information corresponding to the network information content, and configured to push the selected interaction information to the first client.

Said random selection of the interaction information to be pushed to the first client enables different interaction information to be pushed to the first clients even if corresponding network information contents are the same. System robustness may be enhanced through preventing users to submit the correct feedback information without actually paying attention to the network information contents, the validity of the received feedback information in the pushing module can be ensured accordingly.

The processing module 220 is configured to process the feedback information, and to generate an attention index corresponding to the first user ID.

More specifically, the processing module 220 may have stored model information respectively in relation to the interaction information. For instance, if the interaction information is the interaction questions, the model information can be the correct answers to the interaction questions; or if the interaction information is the installation information for particular network application, the model information may be the success installation information for the network application.

Moreover, the processing module 220 is configured to compare the feedback information with the model information to determine if there exists mutual consistency. The processing module 220 determines the user corresponding to the first user ID to have followed the network information content if it is consistent; or determines the user corresponding to the first user ID have not followed the network information content.

More specifically, the processing module 220 may accordingly generate an attention index corresponding to the first user ID based on the determination. For instance, if it is determined that the user has followed the network information content, the processing module 220 would generate the attention index to be "a"; or otherwise generate the attention index to be "0"; wherein "a" can be a constant.

In still another embodiment, the pushing module 210 is further configured to generate a promotion link that includes a first user ID corresponding to the network information content, and to push the promotion link to the first client.

In detail, the pushing module 210 may obtain the first user ID before pushing the network information content and corresponding interaction information to the first client, and generate the promotion link that includes the first user ID accordingly. The pushing module 210 further pushes the promotion link to the first client together with the network information content and corresponding interaction information.

In accordance with another embodiment of the present disclosure, the pushing module 210 is further configured to obtaining a request for link from the first client. The request for link contains the first user ID. The pushing module 210 generates the promotion link according to the request for link. In such embodiment, the first client displays the network information content and corresponding interaction information pushed from the pushing module 210, and generates the request for link according to the user operation thereafter, while the request for link is sent to the pushing module 210.

Further, the promotion link can be communicated among different clients through instant messaging tools, microblogs, message boards, or emails. For example, the first client may distribute the promotional link to the second client. As another example, the first client may distribute the promotional link to a plurality of clients.

The pushing module 210 is configured to obtain an access request from a second client concerning the promotion link, and configured to push the predefined network information contents and corresponding interaction information to the second client according to the access request.

More specifically, the access request may be generated through clicking the promotion link on the second client. The access request may contain a second user ID. In the present embodiment, after the pushing module 210 obtains the access request from the second client, the predefined network information contents and corresponding interaction information may be pushed to the second client, which facilitates the network information contents to be distributed among multiple different clients and benefits the promotion of the network service.

It shall be appreciated that the mentioned first client and the mentioned second client are relatively referred and could be exchanged in desired applications under which the first client can be the second while the second client can be the first. The naming of the first client and the second client is only used for distinguishing different clients rather than any other special reference. The mentioned first and second user IDs are of the same reference for distinguishing the different users.

It shall also be appreciated that FIG. 4 illustrates the simplest application scenario of the system for pushing network information. After the second client receives the promotion link from, for example, the first client, the second client may further distributing the promotion link to other clients, wherein the other clients visits the promotion link and obtains the predefined network information contents and corresponding interaction information.

In accordance with one of the exemplary embodiment, the access request contains the first user ID and the second user ID. The pushing module 210 is further configured to submit the first user ID and the second user ID to the processing module 220. The processing module 220 is further configured to set up a mapping relationship between the first user ID and the second user ID, and set the corresponding level of the first user ID and the second user ID on the mapping relationship.

In detail, the processing module 220 is configured to set the level of the second user ID to be one level lower than its corresponding first user ID, after the mapping relation is set. For instance, the processing module 220 sets the level of the first user ID with the highest level to be level 1, and the second user ID corresponding to this highest level first user ID to be level 2, and so on.

Further, the access request that is obtained by the pushing module 210 may be multiple that are sent from multiple second clients. In this case, the processing module may set up the mapping relationship among the first user ID and the second user IDs to be one-to-many. The processing module 220 can be configured to set multiple second user IDs that are corresponding to the first user ID to be of the same level.

According to one embodiment, the processing module 220 is further configured to generate an attention index corresponding to the second user ID according to the levels of the first user ID and the second user ID, and the feedback information corresponding to the second user ID sent by the second client.

In detail, the pushing module 210 is configured to collect the feedback information corresponding to the second user ID that is uploaded through the second client, and configured to submit the feedback information corresponding to the second user ID to the processing module 220. The processing module 220 is configured to determine whether the level of the second user ID is the lowest. If the level of the second user ID is the lowest, the processing module 220 directly generates the attention index corresponding to the second user ID according to the feedback information; or otherwise, the processing module 220 obtains attention indexes that are corresponding to those user IDs with lower levels than the second user ID, before generating the attention index corresponding to the second user ID according to the attention indexes corresponding to the lower leveled user IDs and the feedback information corresponding to the second user IDs.

According to one embodiment, the processing module 220 is further configured to read an attention index corresponding to the second user ID, and configured to adjust the attention index corresponding to the first user ID according to levels of the first user ID and the second user ID, together with the attention index corresponding to the second user ID.

To be more specific, the processing module 220 finds out the lower level second user IDs of the first user ID according to the mapping relationship, and obtains the attention index corresponding to each of the second user ID.

Furthermore, according to one of the embodiments, the processing module 220 may be configured to adjust the attention index corresponding to the first user ID in the below way:

Adjusted attention index corresponding to the first user ID=Attention index corresponding to the first user ID+Attention index corresponding to the second user ID$*y*10^{j-k}$, wherein j is the level of the first user ID, k is the level of the second user ID, y is a constant less than 0.1.

In the current embodiment, communication may be conducted among different clients through promotion links, thereby further adjusting the attention index corresponding to the first user ID, further improving the accuracy of the obtained attention index.

In accordance with a further embodiment, the processing module 220 may be configured to obtain user profile settings corresponding to the attention index according to the mapping relationship between the attention index and the user profile settings, and configured to set the user profile of the corresponding user IDs according to the obtained user profile settings.

Further, the user profile may include at least one of user level, user credit, etc. The user ID may include either the first user ID or the second user ID, and may be generally referenced as the user IDs for all related network users. The processing module 220 may have stored the mapping relationship between the attention index corresponding to the first user ID and the user profile settings of multiple users, i.e. the attention index mapping with the user credit profile settings. The processing module 220 may be further configured to obtain the user profile settings mapped with the obtained attention index corresponding to the first user ID, and configured to set the user profiles corresponding to the first user IDs according to the obtained user profile settings.

To be specific, an example of user credit is explained herein. The processing module 220 looks up, in the mapping relationship between the attention index corresponding to the first user ID and the user credit settings, for the mapped record that is corresponded to the attention index of the first user ID, according to the attention index obtained above. The processing module 220 obtains the user credit settings according to the mapped record, and modifies the user credit according to the user credit settings.

Figure 5:
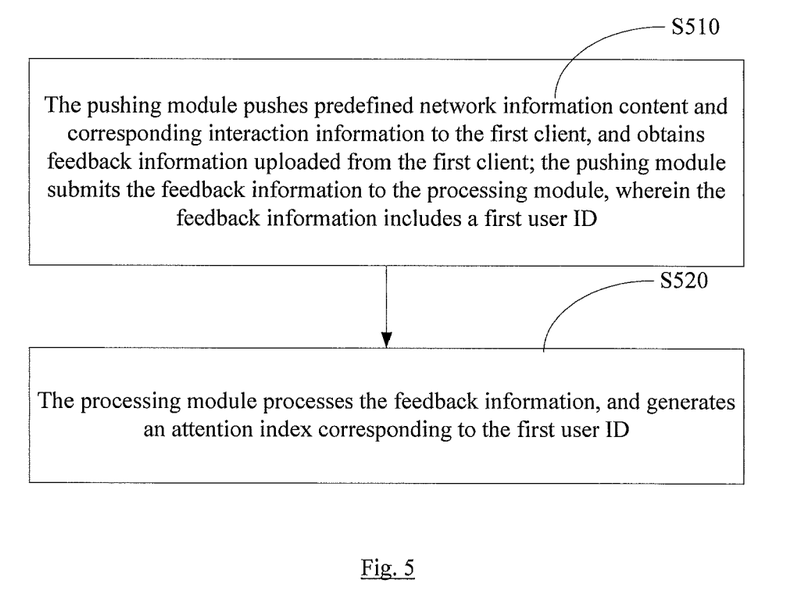
FIG. 5 is a flow diagram of a method for pushing network information according to another embodiment.

Referring now to FIG. 5, a method for pushing network information in accordance with an embodiment includes:

Step S510, the pushing module pushes predefined network information content and corresponding interaction information to the first client, and obtains feedback information uploaded from the first client; the pushing module submits the feedback information to the processing module, wherein the feedback information includes a first user ID.

The network information contents may be corresponded to the physical products or network applications. The pushing module has the network information content stored therein. It shall be appreciated that the network information content may be contents that are used for network information. Further, the pushing module can have multiple network information contents stored therein, while the stored network information contents are aligned in the pushing module through predetermined alignment. The pushing module pushes the network information contents to the first client through the predetermined alignment.

The pushing module may also have interaction information corresponding to the network information contents stored therein. To be more specific, the interaction information may be predefined interaction questions corresponding to the network information contents, e.g. "What is the name of the product mentioned in the network information?", "What is the product mentioned in the network information mainly used for?" According to the present embodiment, the feedback information submitted/uploaded by the first client corresponding to the interaction information is the response to the interaction questions.

Besides, the interaction information may be installation information for particular network applications, the feedback information from the first client thereby may be installation operation instruction for the network application accordingly.

It shall be appreciated that the first client can be any type of client that can interchange data with the pushing module, for example a browser or other clients for applications. Accordingly, the first user ID is the ID that is used for uniquely identifying particular network user.

In accordance with another embodiment, in step S510, when the pushing module pushes the network information content and the corresponding interaction information to the first client, the pushing module may randomly select the interaction information corresponding to the network information content.

Said random selection of the interaction information to be pushed to the first client enables different interaction information to be pushed to the first clients even if corresponding network information contents are the same. System robustness may be enhanced through preventing users to submit the correct feedback information without actually paying attention to the network information contents, the validity of the received feedback information in the pushing module can be ensured accordingly.

Step S520, the processing module processes the feedback information, and generates an attention index corresponding to the first user ID.

More specifically, the processing module may have stored model information respectively in relation to the interaction information. For instance, if the interaction information is the interaction questions, the model information can be the correct answers to the interaction questions; or if the interaction information is the installation information for particular network application, the model information may be the success installation information for the network application.

Moreover, in step S520, the processing module may compare the feedback information with the model information to determine if there exists mutual consistency. It is determined that the user corresponding to the first user ID has followed the network information content if it is consistent; or it is determined that the user corresponding to the first user ID have not followed the network information content.

More specifically, the processing module may accordingly generate an attention index corresponding to the first user ID based on the determination. For instance, if it is determined that the user has followed the network information content, the processing module 220 would generate the attention index to be "a"; or otherwise generate the attention index to be "0"; wherein "a" can be a constant. In still another embodiment, the method for pushing network information further includes: the pushing module generates a promotion link that includes a first user ID corresponding to the network information content, and pushing the promotion link to the first client.

In detail, the pushing module may obtain the first user ID before pushing the network information content and corresponding interaction information to the first client, and generating the promotion link that includes the first user ID accordingly. The pushing module 210 further pushes the promotion link to the first client together with the network information content and corresponding interaction information.

In accordance with another embodiment of the present disclosure, the pushing module is further configured to obtaining a request for link from the first client. The request for link contains the first user ID. The pushing module generates the promotion link according to the request for link. In such embodiment, the first client displays the network information content and corresponding interaction information pushed from the pushing module, and generates the request for link according to the user operation thereafter, while the request for link is sent to the pushing module.

Further, the promotion link can be communicated among different clients through instant messaging tools, microblogs, message boards, or emails.

According to one of the embodiment, the pushing module obtains an access request from a second client concerning the promotion link, and pushes the predefined network information contents and corresponding interaction information to the second client according to the access request.

More specifically, the access request may be generated through clicking the promotion link on the second client. The access request may contain a second user ID. In the present embodiment, after the pushing module obtains the access request from the second client, the predefined network information contents and corresponding interaction information may be pushed to the second client, which facilitates the network information contents to be distributed among multiple different clients and benefits the promotion of the network service.

In accordance with one of the exemplary embodiment, the access request contains the first user ID and the second user ID. After the step that the pushing module obtains the access request for the promotion link from the second client, the method further includes: the pushing module submits the first user ID and the second user ID to the processing module. The processing module sets up a mapping relationship between the first user ID and the second user ID, and sets the corresponding level of the first user ID and the second user ID on the mapping relationship.

In detail, the processing module sets the level of the second user ID to be one level lower than its corresponding first user ID, after the mapping relation is set. For instance, the processing module sets the level of the first user ID with the highest level to be level 1, and the second user ID corresponding to this highest level first user ID to be level 2, and so on.

Further, the access request that is obtained by the pushing module may be multiple that are sent from multiple second clients. In this case, the processing module may set up the mapping relationship among the first user ID and the second user IDs to be one-to-many. The processing module may set multiple second user IDs that are corresponding to the first user ID to be of the same level.

According to one embodiment, the method for pushing network information further includes: the processing module generates an attention index corresponding to the second user ID, according to the levels of the first user ID and the second user ID, and the feedback information corresponding to the second user ID sent by the second client.

In detail, the pushing module collects the feedback information corresponding to the second user ID that is uploaded through the second client, and submits the feedback information corresponding to the second user ID to the processing module. The processing module determines whether the level of the second user ID is the lowest. If the level of the second user ID is the lowest, the processing module directly generates the attention index corresponding to the second user ID according to the feedback information; or otherwise, the processing module obtains attention indexes that are corresponding to those user IDs with lower levels than the second user ID, before generating the attention index corresponding to the second user ID according to the attention indexes corresponding to the lower leveled user IDs and the feedback information corresponding to the second user IDs.

According to one embodiment, after the processing module generates the attention index corresponding to the second user ID, the method further includes: the processing module 120 reads an attention index corresponding to the second user ID, and adjust the attention index corresponding to the first user ID according to levels of the first user ID and the second user ID, together with the attention index corresponding to the second user ID.

To be more specific, the processing module finds out the lower level second user IDs of the first user ID according to the mapping relationship, and obtains the attention index corresponding to each of the second user ID.

Furthermore, according to one of the embodiments, the processing module may adjust the attention index corresponding to the first user ID in the below way:

Adjusted attention index corresponding to the first user ID=Attention index corresponding to the first user ID+Attention index corresponding to the second user ID$*y*10^{j-k}$, wherein j is the level of the first user ID, k is the level of the second user ID, y is a constant less than 0.1.

In the current embodiment, communication may be conducted among different clients through promotion links, thereby further adjusting the attention index corresponding to the first user ID, further improving the accuracy of the obtained attention index.

In accordance with a further embodiment, the method for pushing network information further includes: the processing module obtains user profile settings corresponding to the attention index according to the mapping relationship between the attention index and the user profile settings, and sets the user profile of the corresponding user IDs according to the obtained user profile settings.

Further, the user profile may include at least one of user level, user credit, etc. The user ID may include either the first user ID or the second user ID, and may be generally referenced as the user IDs for all related network users. The processing module may have stored the mapping relationship between the attention index corresponding to the first user ID and the user profile settings of multiple users, i.e. the attention index mapping with the user credit profile settings. The processing module may obtain the user profile settings mapped with the obtained attention index corresponding to the first user ID, and set the user profiles corresponding to the first user IDs according to the obtained user profile settings.

To be specific, an example of user credit is explained herein. The processing module looks up, in the mapping relationship between the attention index corresponding to the first user ID and the user credit settings, for the mapped record that is corresponded to the attention index of the first user ID, according to the attention index obtained above. The processing module obtains the user credit settings according to the mapped record, and modifies the user credit according to the user credit settings.

Skilled person in the art may appreciate that the method and/or process, whether part of or as a whole, may be implemented through specific hardware under instruction of computer program, wherein the program may be understood as being stored in computer readable medium that when read by the computer and being executed, could fulfill the method/process as described above. The computer readable medium may be the type of hard disk, optical disk, Read-Only Memory (ROM), or Random Access Memory (RAM), etc.

Figure 6:
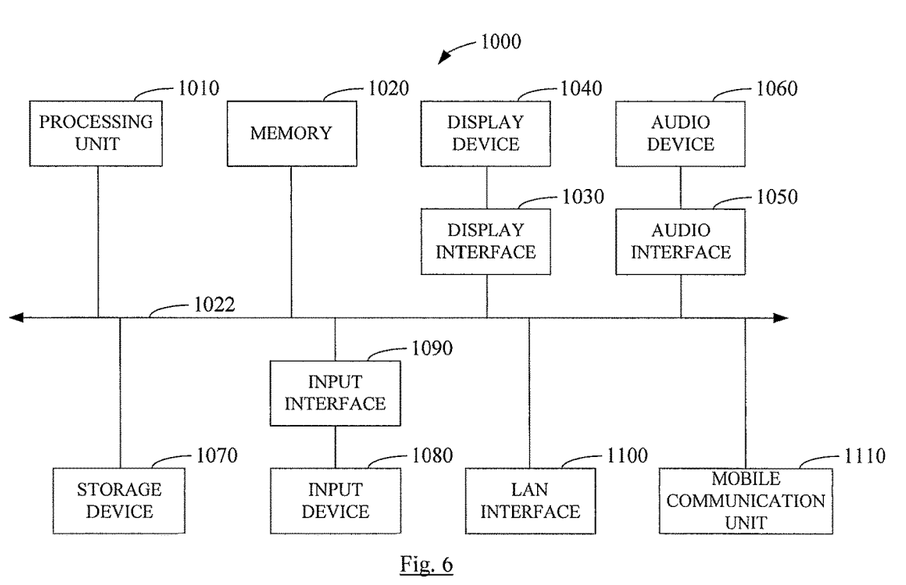
FIG. 6 is a system block diagram of a computing system on which embodiments of the present disclosure can be implemented.

FIG. 6 shows a system block diagram of a computing system 1000 on which embodiments of the invention may be implemented. The computing system 1000 is only one example of a suitable computing environment and is not intended to suggest any limitation as to the scope of use of the invention. Neither should the computing system 1000 be interpreted as having any dependency or requirement relating to any one or combination of components illustrated in the exemplary computing system 1000.

The computing system 1000 shown in FIG. 6 is an example of a computer system suitable for use with the invention. Other architectures having different configurations of subsystems can also be utilized. Examples of well-known computer systems may be suitable for use with embodiments of the invention include, but are not limited to, desktop computers, laptop computers, personal digital assistants, smart phones, tablet computers, portable media players, set top boxes, and the like.

As in FIG. 6 the computing system 1000 includes a processing unit 1010, a memory 1020, and a system bus 1022 that couples various system components including the memory 1020 to the processing unit 1010. The processing unit 1010 is a hardware that carries out the instructions of a computer program by performing the basic arithmetical and logical operations of the computer system. The memory 1020 is a physical device used to store computer program or data (e.g. program state information) on a temporary or permanent basis. The system bus 1022 may be any of several types of bus structures including a memory bus or memory controller, a peripheral bus, and a local bus. The system bus 1022 allows data communication between the processing unit 1010 and the memory 1020, which may include read-only memory (ROM) or flash memory (neither shown), and random access memory (RAM) (not shown). The RAM is generally the main memory into which the operating system and application programs are loaded.

The computing system 1000 further includes a display interface 1030 (e.g., graphic processing unit), a display device 1040 (e.g., liquid crystal display device), an audio interface 1050 (e.g., sound card), and an audio device 1060 (e.g., speaker). The display device 1040 and the audio device 1060 are media devices used to experience multimedia content.

The computing system 1000 typically includes a storage device 1070. The storage device 1070 may be selected from a variety of computer readable media. The computer readable media can be any available media that can be accessed by the computing system 1000 and includes both removable and non-removable media. By way of example, computer readable media includes, but is not limited to, flash memory (e.g., micro SD card), CD-ROM, digital versatile disks (DVD) or other optical disk storage, magnetic cassettes, magnetic tape, magnetic disk storage or other magnetic storage devices, or any other medium which can be used to store the desired information and which can accessed by the computing system 1000.

The computing system 1000 further includes an input device 1080 and an input interface 1090 (e.g., IO controller). A user may enter commands and information into the computing system 1000 through the input device 1080 such as a keyboard, a mouse, a touch panel disposed on the display device 1040. The input device 1080 is often connected to the processing unit 1010 through the input interface 1090 that is coupled to the system bus 1022, but may be connected by other interface and bus structures, such as a universal serial bus (USB).

The computing system 1000 may operate in a networked environment using logical connections to one or more network devices. The network device may be a personal computer, a server, a router, a smart phone, a tablet computer or other common network node. The computing system 1000 connects the network device via a local area network (LAN) interface 1100 or a mobile communication unit 1110. A local area network (LAN) is a computer network that interconnects computers in a limited area such as a home, school, computer laboratory, or office building using network media. Ethernet over twisted pair cabling, and Wi-Fi are the two most common technologies currently used to build LANs. Wi-Fi is a technology that allows the computing system 1000 to exchange data or connect to the internet wirelessly using radio waves. The mobile communication unit 1110 can make and receive telephone calls over a radio link while moving around a wide geographic area. In addition to telephony, the mobile communication unit 1110 also supports internet access by providing mobile data service on the 2G, 3G, or 4G cellular communication system.

It should be noted that, in other computing systems suitable for use with the invention, the computing system may include additional or fewer subsystems. For example, another computing system could include a Bluetooth unit for exchanging data over short distances, an image sensor for photography, and an accelerometer for measuring acceleration.

As described in detail above, the computing system 1000, consistent with the present invention, perform certain operations for the above method for pushing network information. The computing system 1000 may perform these operations in response to the processing unit 1010 executing software instructions contained in the computer readable media. The software instructions may be read into the memory 1020 from the storage device 1070, or from another device via the LAN interface 1100. The software instructions contained in the memory 1020 causes the processing unit 1010 to perform the method for pushing network information as described above. Alternatively, hardwired circuitry may be used in place of or in combination with software instructions to implement processes consistent with the present invention. Thus, the present invention is not limited to any specific combination of hardware circuitry and software.

The above described embodiments explain only several exemplary embodiments of the present disclosure. It shall be mentioned that for those skilled in the art, alternative embodiments could be made to which the present disclosure pertains without departing from its spirit and scope, wherein the alternative embodiments shall be defined as within the claim of the current disclosure.

What is claimed is:

1. A system for pushing network information, comprising:
at least one memory storing instructions; and
at least one processor that executes the instructions to cause the following operations to be performed:
pushing predefined network information content and corresponding interaction information to a first client,
obtaining feedback information from the first client in response to the interaction information, the feedback information comprising a first user ID corresponding to the first client,
processing the obtained feedback information,
generating, from the processed feedback information, an attention index corresponding to the first user ID and indicating a degree of attention of the first client to the pushed predefined network information content,
obtaining user profile settings corresponding to the attention index according to a mapping relationship between the attention index and the user profile settings, and
setting a user profile of the first user ID according to the obtained user profile settings;
generating a promotion link that comprises the first user ID corresponding to the network information content,
pushing the promotion link to the first client,
obtaining an access request from a second client concerning the promotion link having been distributed to the second client by the first client, the access request comprising the first user ID and a second user ID corresponding to the second client and there is a mapping relationship between the first user ID and the second user ID;
pushing the predefined network information content and corresponding interaction information to the second client according to the obtained access request; and
collecting feedback information corresponding to the second user ID generated by the second client in response to the interaction information pushed to the second client that is uploaded through the second client.

2. The system according to claim 1, wherein the operations further include:
randomly selecting the interaction information from a plurality of interaction information corresponding to the network information content, and
the pushed interaction information is the selected interaction information.

3. The system according to claim 1, wherein the processing includes:
comparing the obtained feedback information with model information to determine whether there is mutual consistency between the obtained feedback information and the model information,
determining that the first user has followed the network information content if it is determined that there is mutual consistency and determining that the first user has not followed the network information content if it is determined that there is not mutual consistency, to thereby produce a determination result, and
generating the attention index corresponding to the first user ID according to the determination result.

4. The system according to claim 1,
the operations further including
setting corresponding levels of the first user ID and the second user ID in the mapping relationship.

5. The system according to claim 4, wherein the operations further include:
generating an attention index corresponding to the second user ID according to the levels of the first user ID and the second user ID, and the feedback information corresponding to the second user ID sent by the second client in response to the interaction information pushed to the second client.

6. The system according to claim 5, wherein the operations further include:
determining whether the level of the second user ID is a lowest level,
if the level of the second user ID is determined to be the lowest level, generating the attention index corresponding to the second user ID according to the feedback information corresponding to the second user ID,
if the level of the second user ID is not determined to be the lowest level, obtaining attention indexes corresponding to user IDs with lower levels than the second user ID and which are user IDs corresponding to other clients that requested access to the promotional link, before generating the attention index corresponding to the second user ID according to the attention indexes corresponding to the lower leveled user IDs and the feedback information corresponding to the second user ID.

7. The system according to claim 4, wherein the operations further include:
adjusting the attention index corresponding to the first user ID according to the levels of the first user ID and the second user ID, together with the attention index corresponding to the second user ID.

8. The system according to claim 7, wherein the operations further include:
adjusting the attention index corresponding to the first user ID by the following formula:
adjusted attention index corresponding to the first user ID=attention index corresponding to the first user ID+attention index corresponding to the second user ID$*y*10^{j-k}$, wherein j is the level of the first user ID, k is the level of the second user ID, y is a constant less than 0.1.

9. A method for pushing network information, comprising:
by at least one processor executing instructions stored in at least one memory,
pushing predefined network information content and corresponding interaction information to a first client,
obtaining feedback information uploaded from the first client in response to the pushed interaction information, the obtained feedback information including a first user ID corresponding to the first client,
processing the obtained feedback information,
generating, from the processed feedback information, an attention index corresponding to the first user ID and indicating a degree of attention of the first client to the pushed predefined network information content, obtaining user profile settings corresponding to the attention index according to a mapping relationship between the attention index and the user profile settings, and setting a user profile of the first user ID according to the obtained user profile settings;

generating a promotion link that comprises the first user ID corresponding to the network information content, pushing the promotion link to the first client, obtaining an access request from a second client concerning the promotion link having been distributed to the second client by the first client, the access request comprising the first user ID and a second user ID corresponding to the second client and there is a mapping relationship between the first user ID and the second user ID; and pushing the predefined network information content and corresponding interaction information to the second client according to the obtained access request; and collecting feedback information corresponding to the second user ID generated by the second client in response to the interaction information pushed to the second client that is uploaded through the second client.

10. The method according to claim 9, further comprising, by the at least one processor executing the instructions stored in the at least one memory:

randomly selecting the interaction information from a plurality of interaction information corresponding to the network information content, wherein the pushed interaction information is the selected interaction information.

11. The method according to claim 9, further comprising, by the at least one processor executing the instructions stored in the at least one memory:

comparing the obtained feedback information with model information to determine whether there exists mutual consistency between the obtained feedback information and the model information, determining that the first user has followed the network information content if it is determined that there is mutual consistency and determining that the first user has not followed the network information content if it is determined that there is not mutual consistency, to thereby produce a determination result, and generating the attention index corresponding to the first user ID according to the determination result.

12. The method according to claim 9, wherein the method further comprises, by the at least one processor executing the instructions stored in the at least one memory, and after obtaining the access request:

setting corresponding levels of the first user ID and the second user ID in the mapping relationship.

13. The method according to claim 12, further comprising by the at least one processor executing the instructions stored in the at least one memory:

generating an attention index corresponding to the second user ID, according to the levels of the first user ID and the second user ID, and the feedback information corresponding to the second user ID sent by the second client in response to the interaction information pushed to the second client.

14. The method according to claim 13, wherein said generating an attention index corresponding to the second user ID comprises:

determining whether a level of the second user ID is a lowest level, if the level of the second user ID is determined to be the lowest level, generating the attention index corresponding to the second user ID according to the feedback information corresponding to the second user ID, if the level of the second user ID is not determined to be the lowest level, obtaining attention indexes corresponding to user IDs with lower levels than the second user ID and which are user IDs corresponding to other clients that requested access to the promotional link, before generating the attention index corresponding to the second user ID according to the attention indexes corresponding to the lower leveled user IDs and the feedback information corresponding to the second user ID.

15. The method according to claim 13, wherein after generating the attention index corresponding to the second user ID, the method further comprises, by the at least one processor executing the instructions stored in the at least one memory:

adjusting the attention index corresponding to the first user ID according to the levels of the first user ID and the second user ID, together with the attention index corresponding to the second user ID.

16. The method according to claim 15, wherein said adjusting adjusts the attention index corresponding to the first user ID by the following formula:

adjusted attention index corresponding to the first user ID=attention index corresponding to the first user ID+attention index corresponding to the second user ID*y*10^{j-k}, wherein j is the level of the first user ID, k is the level of the second user ID, y is a constant less than 0.1.

17. A system for pushing network information, comprising:

a pushing server configured to push predefined network information content and corresponding interaction information to a first client, and to obtain feedback information from the first client in response to the interaction information, the feedback information comprising a first user ID corresponding to the first client; and a processing server configured to process the feedback information, to generate, from the processed feedback information, an attention index corresponding to the first user ID and indicating a degree of attention of the first client to the pushed predefined network information content, to obtain user profile settings corresponding to the attention index according to a mapping relationship between the attention index and the user profile settings, and to set a user profile of the first user ID according to the obtained user profile settings;

to generate a promotion link that comprises the first user ID corresponding to the network information content, to push the promotion link to the first client, to obtain an access request from a second client concerning the promotion link having been distributed to the second client by the first client, the access request comprising the first user ID and a second user ID corresponding to the second client and there is a mapping relationship between the first user ID and the second user ID;

to push the predefined network information content and corresponding interaction information to the second client according to the obtained access request; and to collect feedback information corresponding to the second user ID generated by the second client in response to the interaction information pushed to the second client that is uploaded through the second client.

\* \* \* \* \*